(12) United States Patent  
Shimizu

(10) Patent No.: US 6,567,125 B1  
(45) Date of Patent: May 20, 2003

(54) IMAGING APPARATUS WITH POWER REDUCTION AND CORRECTING DEVICES

(75) Inventor: Hitoshi Shimizu, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 08/996,518

(22) Filed: Dec. 23, 1997

(30) Foreign Application Priority Data

Dec. 27, 1996 (JP) .............................................. 8-349663

(51) Int. Cl.[7] .............................................. H04N 5/335
(52) U.S. Cl. ........................................ 348/297; 348/372
(58) Field of Search ................................. 348/221, 222, 348/372, 294, 297, 300, 301, 302, 311; 250/216

(56) References Cited

U.S. PATENT DOCUMENTS

| | | | | |
|---|---|---|---|---|
| 4,525,741 A | * | 6/1985 | Chahal et al. ............... | 348/255 |
| 4,769,711 A | * | 9/1988 | Date .......................... | 348/374 |
| 4,985,775 A | * | 1/1991 | Murayama et al. .......... | 348/250 |
| 5,012,259 A | * | 4/1991 | Hattori et al. ............... | 347/232 |
| 5,146,339 A | * | 9/1992 | Shinohara et al. .......... | 348/301 |
| 5,157,500 A | * | 10/1992 | Gusmano .................... | 348/241 |
| 5,278,656 A | * | 1/1994 | Hynecek et al. ............ | 348/207 |
| 5,532,607 A | * | 7/1996 | Inuzuka et al. ............. | 324/750 |
| 5,637,874 A | * | 6/1997 | Honzawa et al. ........... | 250/361 |
| 5,801,375 A | * | 9/1998 | Sasaki et al. ............... | 250/216 |
| 5,818,528 A | * | 10/1998 | Roth et al. .................. | 348/364 |

* cited by examiner

Primary Examiner—Tuan Ho  
(74) Attorney, Agent, or Firm—Sughrue Mion, PLLC

(57) ABSTRACT

An image producing apparatus includes a power control circuit for reducing power fed to an output amplifier of a CCD during exposure of the CCD and restoring the power fed to the output amplifier to the level before reduction in a predetermined time period before an image signal produced by the CCD is transferred, and an offset corrector for correcting offset of the output amplifier based on an output signal output from the output amplifier after restoration of the power fed to the output amplifier and before the transfer of image signal. According to the thus constituted image producing apparatus, it is possible to reduce a noise caused by heat generated by the CCD even when it is exposed for a long time and can read out an image at high speed.

10 Claims, 5 Drawing Sheets

IMAGING APPARATUS WITH POWER REDUCTION AND CORRECTING DEVICES

BACKGROUND OF THE INVENTION

The present invention relates to an imaging device and, particularly, to such a device using a CCD, charge-coupled device (CCD) which can reduce a noise caused by heat generated by the CCD even when it is exposed for a long time and can read out an image at high speed.

DESCRIPTION OF THE RELATED ART

A chemiluminescent detecting system is known, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information.

Further, a fluorescence system using a fluorescent substance as a labeling substance is known. According to this system, it is possible to study a genetic sequence, the expression level of a gene and the metabolism, absorption, excretion path and state of a substance introduced into a test mouse and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system can also perform a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In the case where such a chemiluminescent emission or fluorescent light is detected by an imaging device using a CCD to produce a chemiluminescent image or a fluorescent image, since chemiluminescent emission or fluorescent light is very weak, the CCD has to be exposed thereto for a long time. However, it is known that when the CCD is exposed for a long time, noise is generated in the image by heat emitted from the CCD. Therefore, the imaging device for detecting very weak light such as chemiluminescent emission or fluorescent light is provided with a cooling means for cooling the CCD in order to reduce such noise caused by the heat.

Since the trend is to use CCDs with larger number of pixels for obtaining high quality images, however, the power consumed by the output amplifier inevitably increases for reading out image data at high speed from a CCD that may have more than one million pixels. Therefore, since a larger quantity of heat is generated, even if the CCD is cooled by a cooling means, it is difficult to reduce noise caused by heat generated by the CCD in an image.

Similar problems occur when very weak light is detected by a solid state image sensor to produce an image for observing a heavenly body or the like.

SUMMARY OF THE INVENTION

It is therefore an object of the present invention to provide an imaging device using a CCD, which can reduce noise caused by heat generated by the CCD even when it is exposed for a long time, and a device which can, read out an image at high speed.

The above and other objects of the present invention can be accomplished by an imaging device comprising a power control means for reducing power fed to an output amplifier of a CCD during exposure of the CCD and restoring the power fed to the output amplifier to the level before reduction a predetermined time period before an image signal produced by the CCD is transferred, and correcting means for correcting offset of the output amplifier based on an output signal output from the output amplifier after restoration of the power fed to the output amplifier and before the transfer of the image signal.

In a preferred embodiment the present invention, the power control means is constituted so as not to feed power to the output amplifier when the CCD is being exposed.

The above and other objects and features of the present invention will become apparent from the following description made with reference to the accompanying drawings.

DESCRIPTION OF THE PREFERRED EMBODIMENT

Figure 1:
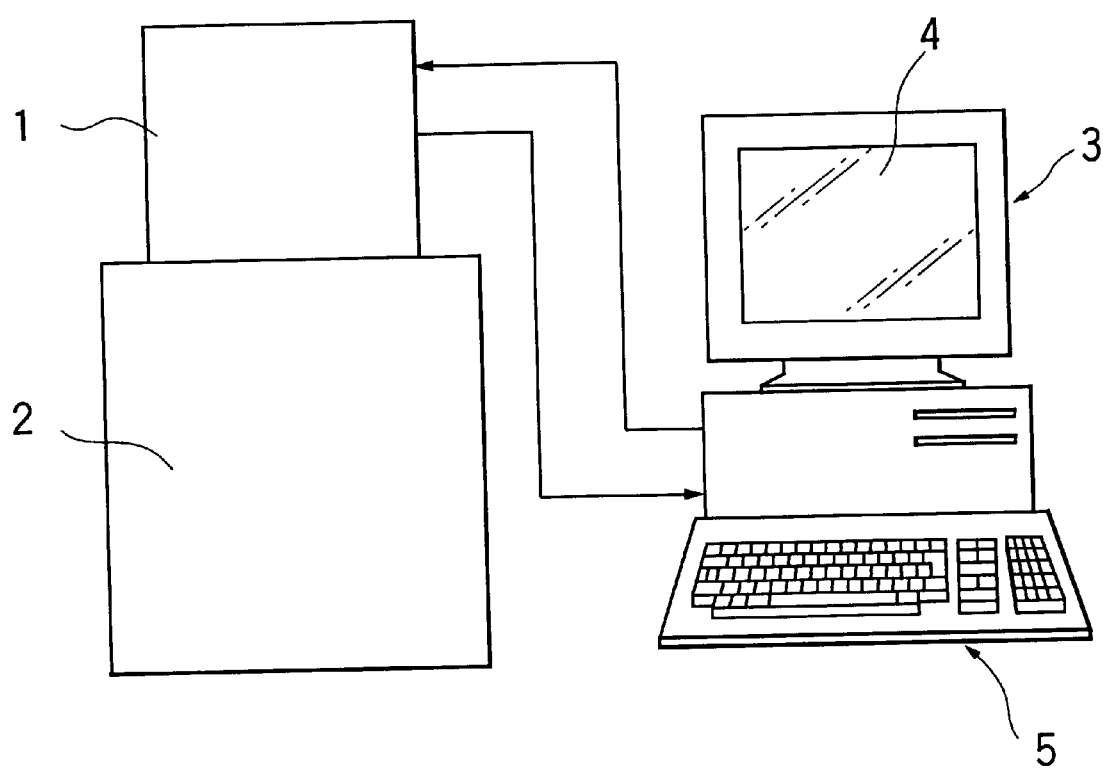
FIG. 1 is a schematic front view showing an image producing apparatus including an imaging device which is an embodiment of the present invention.

As shown in FIG. 1, an image producing apparatus includes an imaging device 1, a dark box 2 and a personal computer 3. The personal computer 3 is equipped with a CRT display 4 and a keyboard 5.

Figure 2:
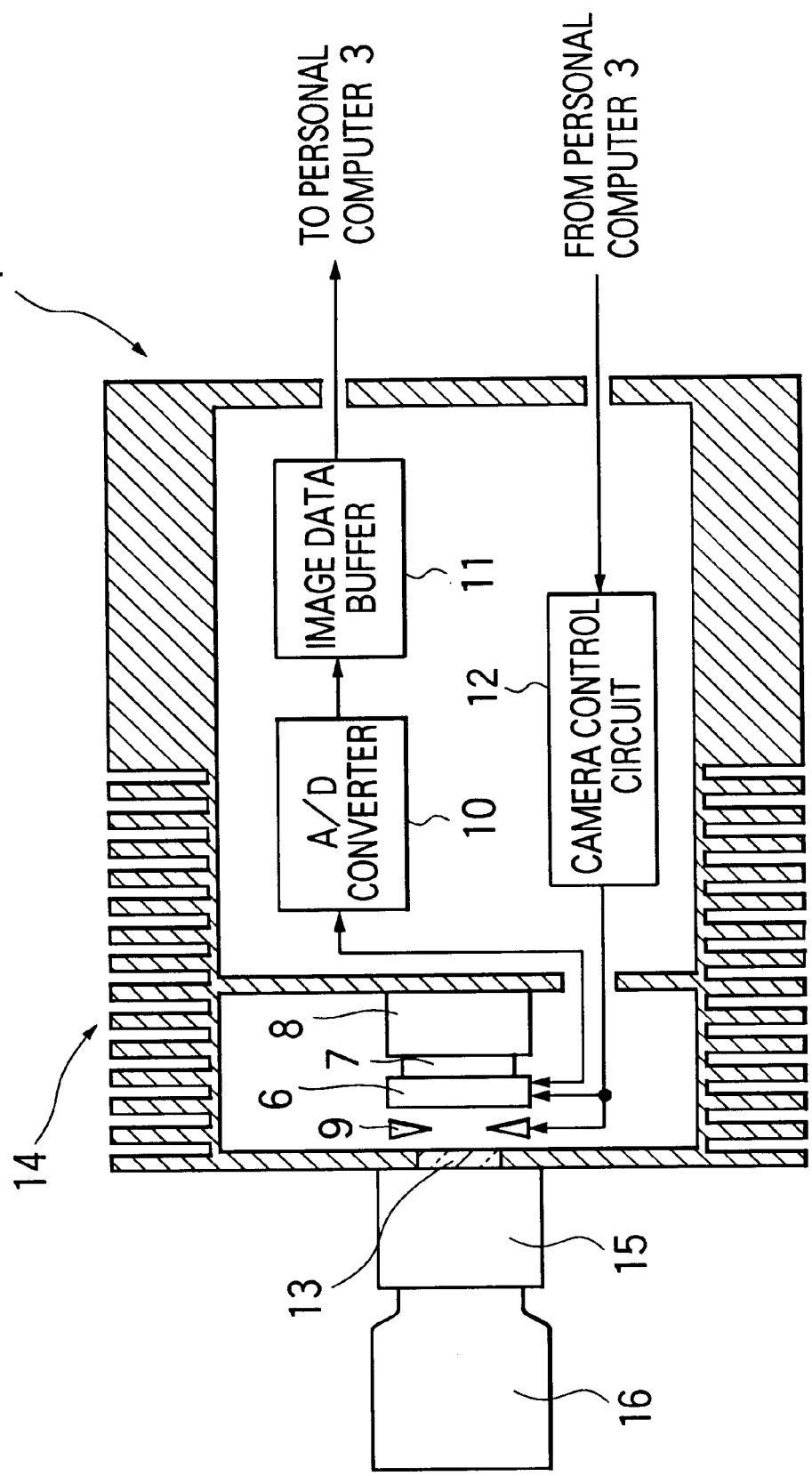
FIG. 2 is a schematic longitudinal cross sectional view showing an imaging device.

FIG. 2 is a schematic longitudinal cross sectional view showing the imaging device 1.

As shown in FIG. 2, the imaging device 1 includes a CCD (charge coupled device) 6, a heat transfer plate 7 made of a metal such as aluminum, a Peltier element 8, a shutter 9 positioned in front of the CCD 6, an A/D converter 10 for converting analog image data produced by the CCD 6 to digital image data, an image data buffer 11 for temporarily storing image data digitized by the A/D converter 10 and a camera controlling circuit 12 for controlling the operation of the imaging device 1. An opening portion formed between the imaging device 1 and the dark box 2 is closed by a glass plate 13 and the periphery of the imaging device 1 is formed with heat dispersion fins 14 over substantially half its length for dispersing heat released from the Peltier element 8.

An image intensifier 15 disposed in the dark box 2 is provided in front of the glass plate 13 provided on the imaging device and a camera lens 16 is mounted on the front surface of the image intensifier 15.

Figure 3:
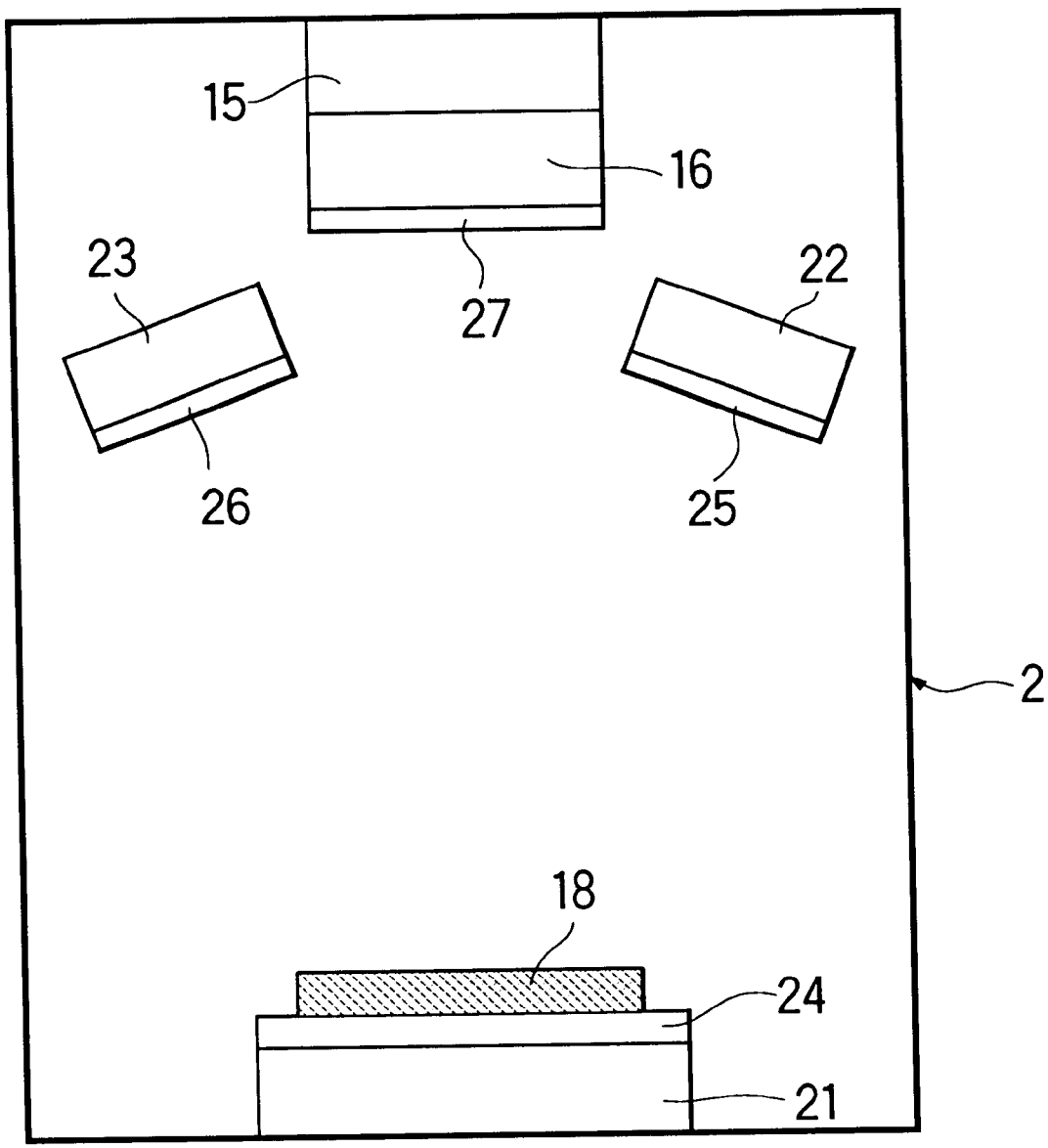
FIG. 3 is a schematic vertical cross sectional view showing a dark box.

FIG. 3 is a schematic longitudinal cross sectional view of the dark box 2.

As shown in FIG. 3, the dark box 2 is equipped with a first blue light emitting diode stimulating ray source 21 for emitting a stimulating ray whose center wavelength is 450 nm, and a second blue light emitting diode stimulating ray source 22 and a third blue light emitting diode stimulating ray source 23 are provided obliquely above the first blue light emitting diode stimulating ray source 21, each being adapted for emitting a stimulating ray whose center wavelength is 450 nm. A filter 24 is adhered to the upper surface of the first blue light emitting diode stimulating ray source 21 and filters 25, 26 are respectively adhered to the front surfaces of the second blue light emitting diode stimulating ray source 22 and the third blue light emitting diode stimulating ray source 23. The filters 24, 25, 26 cut light of wavelengths other than one in the vicinity of 450 nm and harmful to the stimulation of a fluorescent substance and transmit light having a wavelength in the vicinity of 450 nm. A filter 27 for cutting the stimulating ray having a wavelength in the vicinity of 450 nm is detachably provided on the front surface of the camera lens 16.

Figure 4:
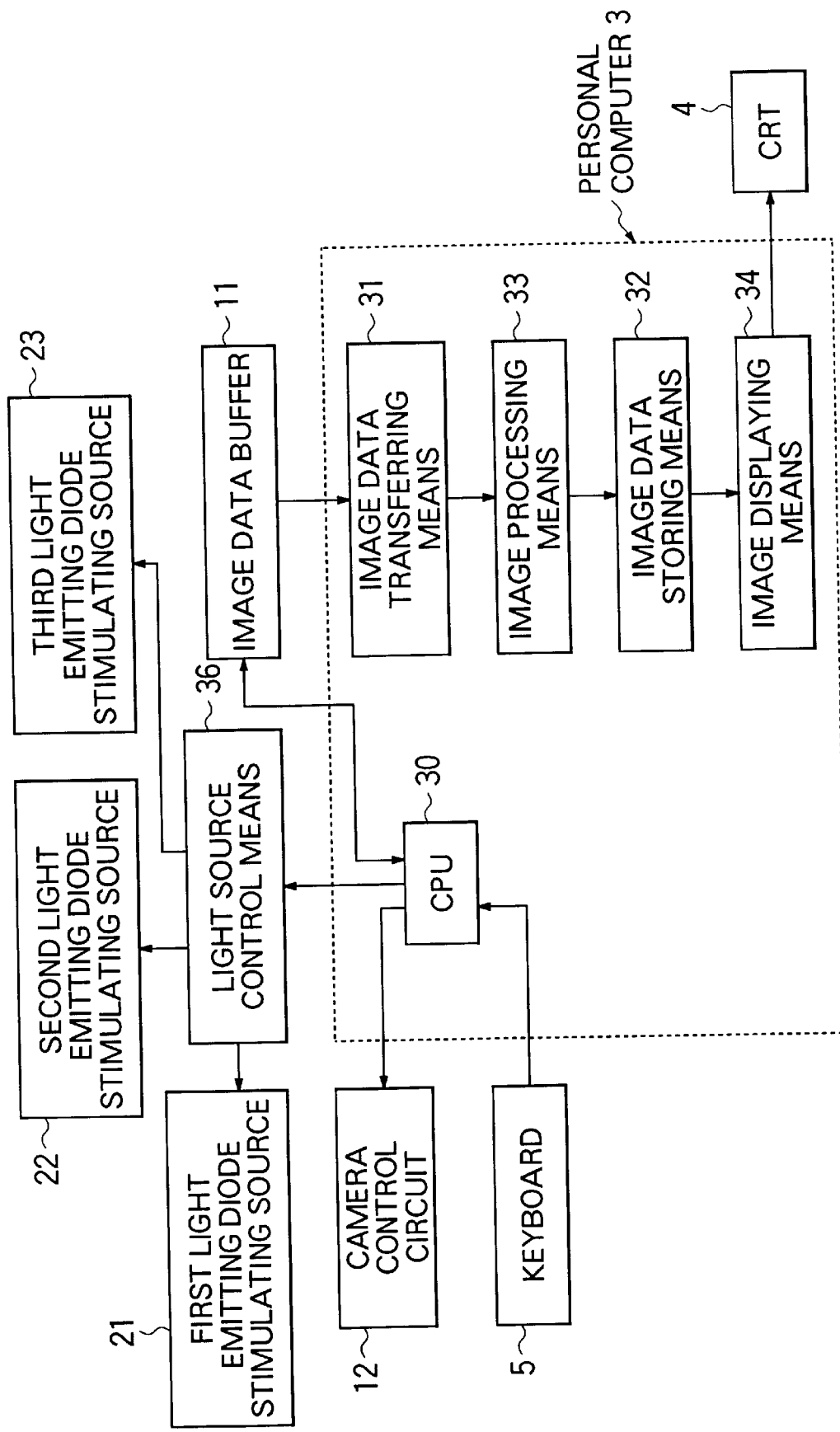
FIG. 4 is a block diagram of a personal computer and peripheral devices thereof.

FIG. 4 is a block diagram of the personal computer 3 and the peripheral devices thereof.

As shown in FIG. 4, the personal computer 3 includes a CPU 30 for controlling the exposure of the imaging device 1, an image data transferring means 31 for reading the image data produced by the imaging device 1 from the image data buffer 11, an image processing means 33 for effecting image processing on the image data read out by the image data transferring means 31 and storing them in an image data storing means 32, and an image displaying means 34 for displaying a visual image on the screen of the CRT display 4 based on the image data stored in the image data storing means 32. The first blue light emitting diode stimulating ray source 21, the second blue light emitting diode stimulating ray source 22 and the third blue light emitting diode stimulating ray source 23 are controlled by a light source control means 36 and an instruction signal can be input via the CPU 30 to the light source control means 36 through the keyboard 5. The CPU 30 is constituted so as to output various signals to the camera controlling circuit 12 of the imaging device 1.

Figure 5:
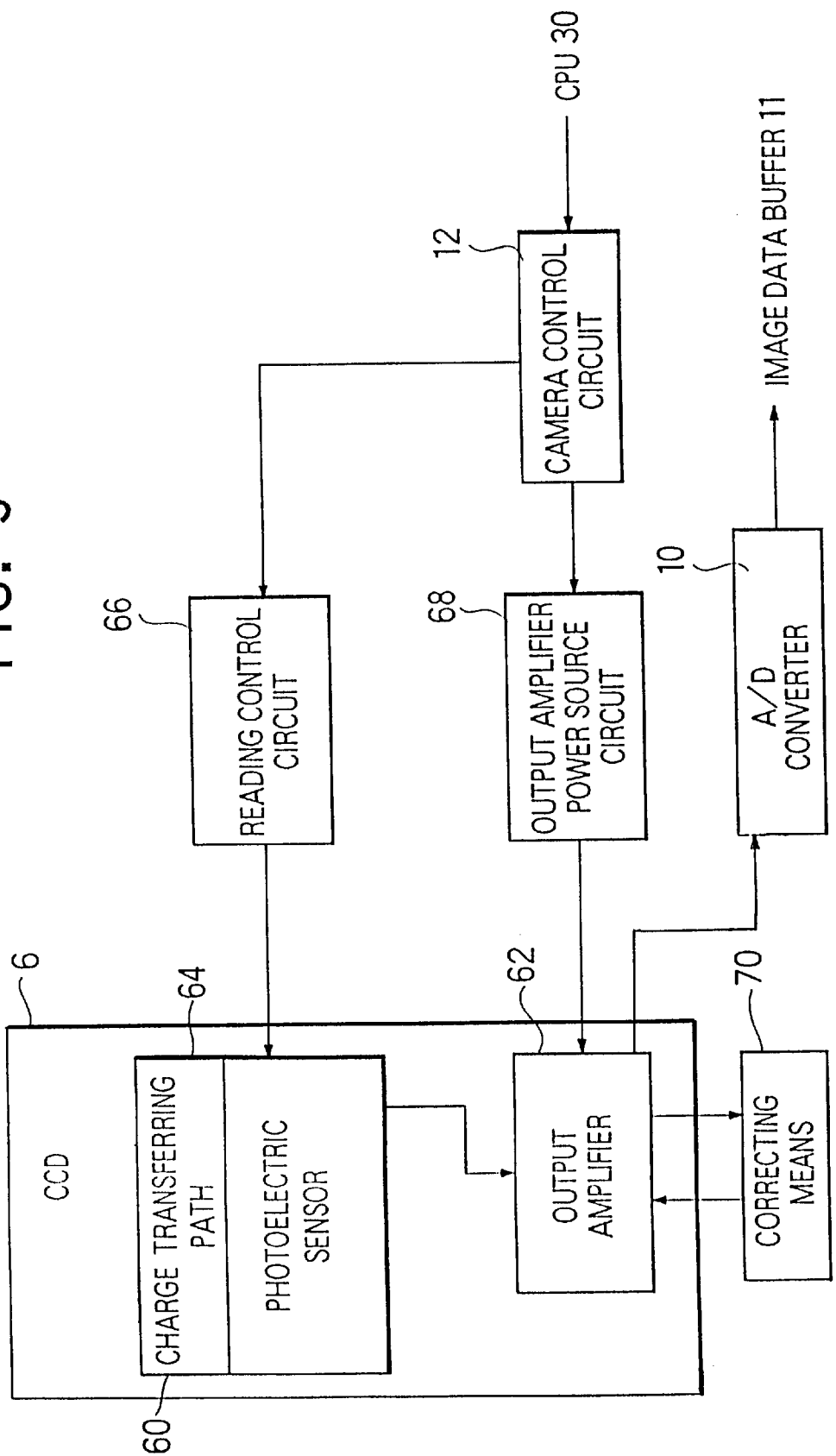
FIG. 5 is a block diagram of a CCD and peripheral devices thereof.

FIG. 5 is a block diagram of the CCD 6 and peripheral devices thereof.

As shown in FIG. 5, the CCD 6 is provided with a photoelectric sensor 60 and an output amplifier 62 and charges accumulated in the photoelectric sensor 60 are fed via a charge transferring path 64 to the output amplifier 62 for output. Transfer of charges from the charge transferring path 64 is controlled by a reading control circuit 66 and power is supplied from an output amplifier power source circuit 68 to the output amplifier 62. The reading control circuit 66 and the output amplifier power source circuit 68 are controlled by the camera controlling circuit 12. A correcting means 70 is provided for correcting the offset of the output amplifier 62 and the output from the output amplifier 62 is input to the correcting means 70. A correction signal produced by the correcting means 70 is input to the output amplifier 62.

The image producing apparatus according to this embodiment is adapted to detect fluorescent light emitted from an image carrier carrying an image of a fluorescent substance and chemiluminescence emission generated by contacting a chemiluminescent substance with a labeling substance and produce a fluorescent image and a chemiluminescent image. As termed in this specification, an image carrier carrying an image of a fluorescent substance includes an image carrier carrying an image of a specimen labeled with a fluorescent substance and an image carrier carrying an image of a fluorescent substance obtained by combining enzyme with a labeled specimen, contacting the enzyme and a fluorescent substrate, thereby changing the fluorescent substrate to a fluorescent substance capable of emitting fluorescent light.

An image carrier 18, which is a specimen, is first placed on the filter 24 and the lens focus is adjusted by the user. After the dark box 2 has been closed, the user inputs an exposure start signal through the keyboard 5. The first blue light emitting diode stimulating ray source 21 alone or the second blue light emitting diode stimulating ray source 22 and the third blue light emitting diode stimulating ray source 23 are turned on by the light source control means 35, thereby emitting a stimulating ray toward the image carrier 18. At the same time, the exposure start signal is input through the CPU 30 to the camera controlling circuit 12 of the imaging device 1 and the shutter 9 is opened by the camera controlling circuit 12, thereby starting the exposure of the CCD 6. When the camera controlling circuit 12 receives the exposure start signal, it simultaneously outputs a power control signal to the output amplifier power source circuit 68, thereby decreasing power fed from the output amplifier power source circuit 68 to the output amplifier 62.

Light components of wavelengths not in the vicinity of 450 nm are cut by the filters 24, 25, 26 from the stimulating rays emitted from the first blue light emitting diode stimulating ray source 21 alone or the second blue light emitting diode stimulating ray source 22 and the third blue light emitting diode stimulating ray source 23. As a result, the fluorescent substance contained in the image carrier 18 is stimulated by light having a wavelength in the vicinity of 450 nm, thereby emitting fluorescent light.

The fluorescent light emitted from the fluorescent substance contained in the image carrier 18 enters the photoelectrical surface of the image intensifier 15 via the filter 27 and the camera lens 16 and is amplified so that an image is formed on the fluorescent surface of the image intensifier 15. The CCD 6 of the cooled CCD camera 1 receives light from the image formed on the fluorescent surface of the image intensifier 15 to convert the energy of the light to electric charges and accumulates them. Since light components having wavelengths in the vicinity of 450 nm are cut by the filter 27, only fluorescent light emitted from the fluorescent substance contained in the image carrier 18 is received by the CCD 6 of the imaging device 1.

When a predetermined exposure time has passed, the CPU 30 outputs an exposure completion signal to the camera control circuit 12 of the imaging device 1. When the camera control circuit 12 receives the exposure completion signal, it outputs a power control signal to the output amplifier power source circuit 68, thereby increasing power fed from the output amplifier power source circuit 68 to the output amplifier 62 up to the level capable of transferring analog image data accumulated in the output amplifier 62 in the form of charges and transferring charges produced and accumulated in the charge transferring path 64 during the exposure of the photoelectric sensor 60 via the output amplifier 62 to the correcting means 70.

When an output signal from the output amplifier 62 stabilizes after the power fed from the output amplifier power source circuit 68 to the output amplifier 62 has been increased up to the level enabling the output amplifier 62 to transfer analog image data accumulated in the form of charges, the correcting means 70 produces a correction signal for correcting the offset of the output amplifier 62 and outputs it within a predetermined time period to the output amplifier 62, thereby correcting the offset of the output amplifier 62.

After a predetermined time period has passed, the camera control circuit 12 transfers the analog image data accumulated in the photoelectric sensor 60 of the CCD 6 in the form of charge to the A/D converter 10 in response to a control signal from the CPU 30 to cause the A/D converter 10 to digitize the image data and temporarily store the thus digitized image data in the image data buffer 11. At the same time, the CPU 30 outputs a data transfer signal to the image data transferring means 31 to cause it to read out the digital image data temporarily stored in the image data buffer 11 of the imaging device 1 and to input them to the image processing means 33. The image processing means 33 effects image processing on the image data input from the image data transferring means 31 and stores them in the image data storing means 32.

Afterward, when the user inputs an image production signal through the keyboard 5, the image displaying means 34 reads out the image data stored in the image data storing means 32 and a fluorescent image is displayed on the screen of the CRT display 4 based on the read out image data.

A chemiluminescent image is produced in the same manner as a fluorescent image except that the filter 27 is removed and the first blue light emitting diode stimulating ray source 21, the second blue light emitting diode stimulating ray source 22 and the third blue light emitting diode stimulating ray source 23 are kept off, a specimen 18 capable of emitting chemiluminescent emission is placed on the filter 24, and chemiluminescent emission emitted from the specimen 18 is photoelectrically detected. Namely, chemiluminescent emission emitted from the specimen 18 is photoelectrically detected by the CCD 6 via the camera lens 16 and the image intensifier 15 to produce image data and a chemiluminescent image is displayed on the screen of the CRT display 4.

According to the above described embodiment, when the camera control circuit 12 receives an exposure start signal, it outputs a power control signal to the output amplifier power source circuit 68 to lower power fed from the output amplifier power source circuit 68 to the output amplifier 62. Therefore, even when the CCD is exposed to light for a long time for detecting very weak light such as chemiluminescence emission or fluorescent light, it is possible to prevent noise caused by heat emitted from the CCD 6 from being generated in the image. Further, when the camera control circuit 12 receives an exposure completion signal, it outputs a power control signal to the output amplifier power source circuit 68 to cause it to feed power capable of transferring analog image data accumulated in the CCD 6 in the form of charges to the output amplifier 62. Therefore, even when a CCD having an extremely great number of pixels is used for obtaining an image of high quality, image data can be read out at high speed. Moreover, when the output signal from the output amplifier 62 stabilizes after power fed from the output amplifier power source circuit 68 to the output amplifier 62 has been increased up to the level enabling the output amplifier 62 to transfer analog image data accumulated in the form of charges, the correcting means 70 produces a correction signal for correcting the offset of the output amplifier 62 and corrects the offset of the output amplifier 62 within a predetermined time period and analog image data accumulated in the CCD 6 in the form of charges are then transferred. Therefore, it is possible to obtain a stable image signal.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, although the camera control circuit 12 effects control so as to lower power fed from the output amplifier power source circuit 68 to the output amplifier 62 during the exposure of the CCD 6, so long as the exposure operation of the CCD 6 is not affected, it is possible to effect control so as to feed no power from the output amplifier power source circuit 68 to the output amplifier 62 during the exposure of the CCD 6.

Further, in the above described embodiment, although the image intensifier 15 is provided in front of the imaging device 1, it is not absolutely necessary to provide the image intensifier 15.

Furthermore, in the above described embodiment, although the first blue light emitting diode stimulating ray source 21, the second blue light emitting diode stimulating ray source 22 and the third blue light emitting diode stimulating ray source 23 are provided in the dark box 2, only the first blue light emitting diode stimulating ray source 21, or only the second blue light emitting diode stimulating ray source 22 and the third blue light emitting diode stimulating ray source 23 may be provided.

Further, in the above described embodiment, blue light emitting diode stimulating ray sources 21, 22, 23 adapted to emit stimulating rays whose center wavelength is 450 nm are used, a light emitting diode stimulating ray source for emitting light whose center wavelength is in the range between 400 and 700 nm may be employed depending on the kind of fluorescent substance.

Furthermore, in the above described embodiment, when an exposure start signal is input through the keyboard 5, the first blue light emitting diode stimulating ray source 21 alone or the second blue light emitting diode stimulating ray source 22 and the third blue light emitting diode stimulating ray source 23 are turned on by the light source control means 35. However, it is not absolutely necessary to constitute the light source control means 35 so as to be controlled by the personal computer 3 and the light source control means 35 may be manually operated.

Moreover, in the above described embodiment, the filter 27 for cutting light having a wavelength in the vicinity of 450 nm is detachably mounted on the front surface of the camera lens 16 and the image producing apparatus is constituted so as to be able to detect extremely weak chemiluminescent emission and produce a chemiluminescent image when the filter 27 is removed. However, the image producing apparatus may be constituted so as to produce only a fluorescent image by the fluorescent detection system, in which case the filter 27 can be fixed to the front surface of the camera lens 16.

Further, in the above described embodiment, although the first blue light emitting diode stimulating ray source 21, the second blue light emitting diode stimulating ray source 22 and the third blue light emitting diode stimulating ray source 23 are provided, it is unnecessary to provide the first blue light emitting diode stimulating ray source 21, the second blue light emitting diode stimulating ray source 22 and the third blue light emitting diode stimulating ray source 23 and also filters 24, 25, 26, 27 in the case where an image producing apparatus is used only for detecting chemiluminescence emission and producing a chemiluminescent image.

Moreover, in the above described embodiment, although the CCD camera 1 is formed with heat dispersion fins 14 over substantially half its length for dispersing heat released from the Peltier element 8, it is possible to form the heat dispersion fins 14 on the periphery of the CCD camera 1 over its entire length and the arrangement of the heat dispersion fin 14 on the periphery of the CCD camera 1 may be arbitrarily determined.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an imaging device using a CCD, which can reduce noise caused by heat generated by the CCD even when it is exposed for a long time and can read out an image at high speed.

What is claimed is:

1. An image producing apparatus comprising:
   a power controller for reducing power fed to an output amplifier of a CCD during exposure of the CCD, and for restoring the power fed to the output amplifier to that of a level before reduction in a predetermined time period before an image signal produced by the CCD is transferred; and
   a correcting device for correcting offset of the output amplifier based on a signal output from the output amplifier after restoration of the power fed to the output amplifier, and before the transfer of the image signal, wherein when an output signal from the output amplifier stabilizes after the power fed from the output amplifier power source circuit to the output amplifier to transfer analog image data accumulated in the form of charges, the correcting device produces a correction signal for correcting the offset of the output amplifier and outputs it within a predetermined time period to the output amplifier, thereby correcting the offset of the output amplifier.

2. An image producing apparatus in accordance with claim 1, wherein the power controller does not feed power to the output amplifier when the CCD is being exposed.

3. An image producing apparatus comprising:
   a dark box;
   an imaging device, wherein said imaging device comprises:
      a CCD;
      a power controller for reducing power fed to an output amplifier of the CCD during exposure of the CCD, and for restoring the power fed to the output amplifier to that of a level before reduction in a predetermined time period before an image signal produced by the CCD is transferred; and
      a correcting device for correcting offset of the output amplifier based on a signal output from the output amplifier after restoration of the power fed to the output amplifier, and before the transfer of the image signal, wherein when an output signal from the output amplifier stabilizes after the power fed from the output amplifier power source circuit to the output amplifier to transfer analog image data accumulated in the form of charges, the correcting device produces a correction signal for correcting the offset of the output amplifier and outputs it within a predetermined time period to the output amplifier, thereby correcting the offset of the output amplifier; and
   a computer system for controlling said imaging device and said dark box.

4. An image producing apparatus according to claim 3, wherein said dark box comprises:
   at least one emitting diode stimulating ray source;
   a filter adhered to said at least one light emitting diode stimulating ray source; and
   a camera lens with a lens filter.

5. An image producing apparatus according to claim 4, further comprising an image intensifier.

6. An image producing apparatus according to claim 4, wherein said at least one light emitting diode stimulating ray source emits a stimulating ray with a center wavelength of 450 nm.

7. An image producing apparatus according to claim 4, wherein said at least one light emitting diode stimulating ray source emits a stimulating ray with a center wavelength in a range between 400 and 700 nm.

8. An image producing apparatus according to claim 4, wherein said filter cuts light having a wavelength at 450 nm.

9. An image producing apparatus according to claim 4, wherein said lens filter is fixed to the camera lens during fluorescence detection.

10. An image producing apparatus according to claim 3, wherein said CCD is formed with heat dispersion fins on at least a section of said CCD.

* * * * *